US00RE49189E

(19) United States
(12) Reissued Patent
Scozzaro

(10) Patent Number: US RE49,189 E
(45) Date of Reissued Patent: Aug. 23, 2022

(54) METHOD FOR RECONSTRUCTING THE MAP OF AN ENVIRONMENT SURROUNDING A WIRELESS DEVICE AND WIRELESS DEVICE IMPLEMENTING SUCH METHOD

(71) Applicant: SISVEL TECHNOLOGY S.R.L., None (IT)

(72) Inventor: Andrea Scozzaro, Turin (IT)

(73) Assignee: Sisvel Technology S.R.L., None (IT)

(21) Appl. No.: 16/234,072

(22) Filed: Dec. 27, 2018

Related U.S. Patent Documents

Reissue of:
(64) Patent No.: 9,538,322
Issued: Jan. 3, 2017
Appl. No.: 14/345,291
PCT Filed: Sep. 20, 2012
PCT No.: PCT/IB2012/054986
§ 371 (c)(1),
(2) Date: Mar. 17, 2014
PCT Pub. No.: WO2013/042059
PCT Pub. Date: Mar. 28, 2013

(30) Foreign Application Priority Data

Sep. 20, 2011 (IT) ..... TO2011A000839

(51) Int. Cl.
*H04W 4/029* (2018.01)
*H04W 64/00* (2009.01)
(Continued)

(52) U.S. Cl.
CPC ..... *H04W 4/029* (2018.02); *G01S 1/68* (2013.01); *H04W 4/02* (2013.01); *H04W 64/00* (2013.01)

(58) Field of Classification Search
CPC .... G01S 1/68; G01S 5/02521; G01S 5/02523; G01S 5/02524; G01S 5/02525;
(Continued)

(56) References Cited

U.S. PATENT DOCUMENTS 5,726,435 A * 3/1998 Hara ..... G06K 7/14 235/462.09
7,047,326 B1 * 5/2006 Crosbie et al. ..... 710/16
(Continued)

FOREIGN PATENT DOCUMENTS

JP 2002-228481 A 8/2002
JP 2005-36587 A 2/2005
(Continued)

OTHER PUBLICATIONS

International Preliminary Report and Written Opinion dated Mar. 25, 2014, issued in PCT Application No. PCT/IB2012/054986, filed Sep. 20, 2012.
(Continued)

*Primary Examiner* — Charles R Craver
(74) *Attorney, Agent, or Firm* — Workman Nydegger

(57) ABSTRACT

A method for reconstructing the map of an environment (20) surrounding a wireless device (100), the environment (20) being equipped with one or more radio frequency tags (1) set in a number dependent on the level of detail to be obtained in the reconstruction, the method including the steps of: receiving identification and localization data of the one or more radio frequency tags (1) over a wireless connection by at least one wireless receiver (3) of the wireless device (100); storing the identification and localization data of the one or more radio frequency tags (1) into a filing and/or storage component (5,6) by a processor (2) of the wireless device (100); and providing on an output component (7) of the wireless device (100) at least one map of the environment (20) built on the basis of the identification and localization data of the radio frequency tags (1).

13 Claims, 5 Drawing Sheets

Associated environmental element

| Localization data | | | | Identification data | | | |
|---|---|---|---|---|---|---|---|
| Tag ID | Latitude | Longitude | Elevation | Floor | Type | Room / corridor / perimeter ID | Order No. |
| 001 | 45,00 | 15,00 | 250,0 | 1 | Perimeter | 1 | 1 |
| 002 | 45,00 | 14,88 | 250,0 | 1 | Perimeter | 2 | 2 |
| ... | ... | ... | ... | ... | ... | ... | |
| 015 | 44,67 | 14,90 | 250,1 | 1 | Corridor | 3 | 2 |
| 016 | 44,67 | 14,89 | 250,1 | 1 | Corridor | 3 | 3 |
| | | | | | | | |
| 025 | 44,28 | 14,91 | 251,5 | 1 | Door | 4 | 6 |
| ... | ... | ... | ... | ... | ... | ... | |
| 037 | 44,21 | 14,95 | 251,0 | 1 | Room | 5 | - |
| 038 | 44,20 | 14,96 | 251,0 | 1 | Room | 5 | - |
| ... | ... | ... | ... | ... | ... | ... | ... |

(51) Int. Cl.
*G01S 1/68* (2006.01)
*H04W 4/02* (2018.01)

(58) Field of Classification Search
CPC ... G01S 5/02526; H04W 4/021; H04W 4/024; H04W 4/025; H04W 4/029; H04W 64/00
See application file for complete search history.

(56) References Cited

U.S. PATENT DOCUMENTS 7,263,375 B2 * 8/2007 Zavada ..... H04W 64/00 342/357.52
7,584,048 B2 * 9/2009 Pham ..... G01C 21/20 701/434
7,751,971 B2 * 7/2010 Chang ..... G01C 21/30 701/426
8,437,954 B1 * 5/2013 Freeman ..... G01C 21/206 701/426
9,775,053 B2 * 9/2017 Scozzaro ..... G01S 5/0063
9,886,603 B2 * 2/2018 Shimada ..... G06K 7/10
10,609,519 B1 * 3/2020 Chaskar ..... H04W 24/10
2005/0099307 A1 * 5/2005 Gilfix ..... A61H 3/061 340/573.1
2006/0126918 A1 * 6/2006 Oohashi ..... G05D 1/0251 382/153
2007/0001862 A1 * 1/2007 Zweig ..... G06K 19/0717 340/588
2008/0051991 A1 * 2/2008 Lee ..... G01C 21/3623 701/533
2008/0052384 A1 * 2/2008 Marl et al. ..... 709/223
2008/0309461 A1 * 12/2008 Mizuki ..... G06Q 50/28 340/10.1
2009/0153328 A1 * 6/2009 Otani ..... G06Q 30/02 340/572.1
2009/0231142 A1 * 9/2009 Nikitin ..... G06K 7/0008 340/572.8
2010/0084468 A1 * 4/2010 Lapstun ..... 235/454
2012/0158297 A1 * 6/2012 Kim ..... H04W 4/80 701/516
2013/0151636 A1 * 6/2013 Majeti et al. ..... 709/206
2017/0328995 A1 * 11/2017 Marschalkowski ..... G01S 13/88
2020/0382919 A1 * 12/2020 Huang ..... H04W 4/02
2020/0386848 A1 * 12/2020 Wirola ..... G01S 5/08

FOREIGN PATENT DOCUMENTS

JP 2007-303871 A 11/2007
JP 2007-333998 A 12/2007
JP 2008 18104 8/2008
JP 2008 181504 8/2008
JP 2008-219358 A 9/2008
WO WO2006/096431 9/2006

OTHER PUBLICATIONS

International Search Report dated Jan. 25, 2013, in PCT Application No. PCT/IB2012/054986, filed Sep. 20, 2012.
Japanese Office Action received in Application No. 2014-530375, dated Jul. 20, 2016.

* cited by examiner

| | Associated environmental element | | | | | | |
|---|---|---|---|---|---|---|---|
| | Localization data | | | Identification data | | | |
| Tag ID | Latitude | Longitude | Elevation | Floor | Type | Room / corridor / perimeter ID | Order No. |
| 001 | 45,00 | 15,00 | 250,0 | 1 | Perimeter | 1 | 1 |
| 002 | 45,00 | 14,88 | 250,0 | 1 | Perimeter | 2 | 2 |
| ... | ... | ... | ... | ... | ... | ... | |
| 015 | 44,67 | 14,90 | 250,1 | 1 | Corridor | 3 | 2 |
| 016 | 44,67 | 14,89 | 250,1 | 1 | Corridor | 3 | 3 |
| | | | | | | | |
| 025 | 44,28 | 14,91 | 251,5 | 1 | Door | 4 | 6 |
| ... | ... | ... | ... | ... | ... | ... | |
| 037 | 44,21 | 14,95 | 251,0 | 1 | Room | 5 | - |
| 038 | 44,20 | 14,96 | 251,0 | 1 | Room | 5 | - |
| ... | ... | ... | ... | ... | ... | ... | ... |

Fig. 4

METHOD FOR RECONSTRUCTING THE MAP OF AN ENVIRONMENT SURROUNDING A WIRELESS DEVICE AND WIRELESS DEVICE IMPLEMENTING SUCH METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a Reissue application of U.S. patent application Ser. No. 14/345,291, filed Mar. 17, 2014, now U.S. Pat. No. 9,538,322, which issued on Jan. 3, 2017, which is a nationalization of PCT Application No. PCT/IB2012/054986, filed Sep. 20, 2012, and claims priority to Italian Application No. TO2011A0839, filed Sep. 20, 2011, which are incorporated herein by specific reference.*

BACKGROUND OF THE INVENTION

1. Field of the Invention

The present invention relates to a method for reconstructing a map of an environment surrounding a wireless device, so as to allow a user of the device to locate his/her own position within said environment.

The present invention also relates to a wireless device implementing such a method.

2. Present State of the Art

Various systems are known in the art which are finalized to localize a device, and hence its user, within a certain environment (e.g. public buildings, shopping centres, museums, town halls, hospitals).

More in particular, such systems are based mainly on information deriving from communication between a radio frequency reader, built in the device, and a plurality of radio frequency identifiers (i.e. RFID tags), arranged within the environment according to a predetermined layout.

Such tags include information about their own position, which information is transmitted to a local server.

In order to be able to operate, therefore, these systems require the device to be connected to a network (whether a local area network or a wide area network) and to know the URL address of the server to which the information about the positions of the radio frequency tags are sent.

As an alternative, for example, it is known from Japanese patent application no. JP 2007-235496 to download data of a map of an environment from a server to a memory of the device, although this clearly implies problems related to periodic updating and to the necessity for the device to be in a known environment, since its use in unknown environments is not conceivable.

Furthermore, the methods currently available cannot provide the user with visual indications about the type of the elements (exits, corridors, rooms) present in the surrounding environment, which indications are often necessary for reaching a given destination; to this end, one must still use paper maps or indications available on the premises.

SUMMARY OF THE INVENTION

It is therefore one object of the present invention to provide a method for reconstructing the map of an environment surrounding a wireless device which can provide a sufficiently accurate graphic representation of the environment where the device is located.

It is another object of the present invention to provide a method for reconstructing the map of an environment surrounding a wireless device which can be used without having previously obtained information about the environment itself.

It is a further object of the present invention to provide a method for reconstructing the map of an environment surrounding a wireless device which is less costly than prior-art methods.

These and other objects of the invention are obtained through a method for reconstructing the map of an environment surrounding a wireless device and through a wireless device implementing such method as set out in the appended claims, which are an integral part of the present description.

In brief, for each radio frequency tag or point to be represented on the map, all or some of the following pieces of information are made available

- absolute and geographical coordinates of the place in terms of latitude, longitude and elevation; or
- coordinates (e.g. Cartesian, polar, etc.) of a known point, e.g. expressed either in absolute terms or in relative terms as distances from a given point with respect to the three dimensions;
- relative geographical information, such as building number, floor, sector, staircase and the like;
- information about a certain object or environmental element (door, window, wall, staircase, column and the like).

Based on such information, it is possible to obtain an approximate map of the place where the device is located, as well as the position thereof within that area, so as to offer the user of the device a good margin of orientation on the premises without having to make use of paper maps or other information sources.

Further features of the invention are set out in the appended claims, which are intended to be an integral part of the present description.

BRIEF DESCRIPTION OF THE DRAWINGS

The above objects will become more apparent from the following detailed description of a method for reconstructing the map of a surrounding environment and of a wireless device implementing such method, with particular reference to the annexed drawings, wherein:

FIG. 4 shows some values of a table of identification and localization data relating to the radio frequency tags of FIG. 3;

DETAILED DESCRIPTION OF THE PREFERRED EMBODIMENTS

As aforementioned, the object of the present invention is a method which, by using information about the radio frequency tags 1, in particular RFID tags, can provide an approximate map of the premises where a device 100 according to the present invention is located.

Figure 1:
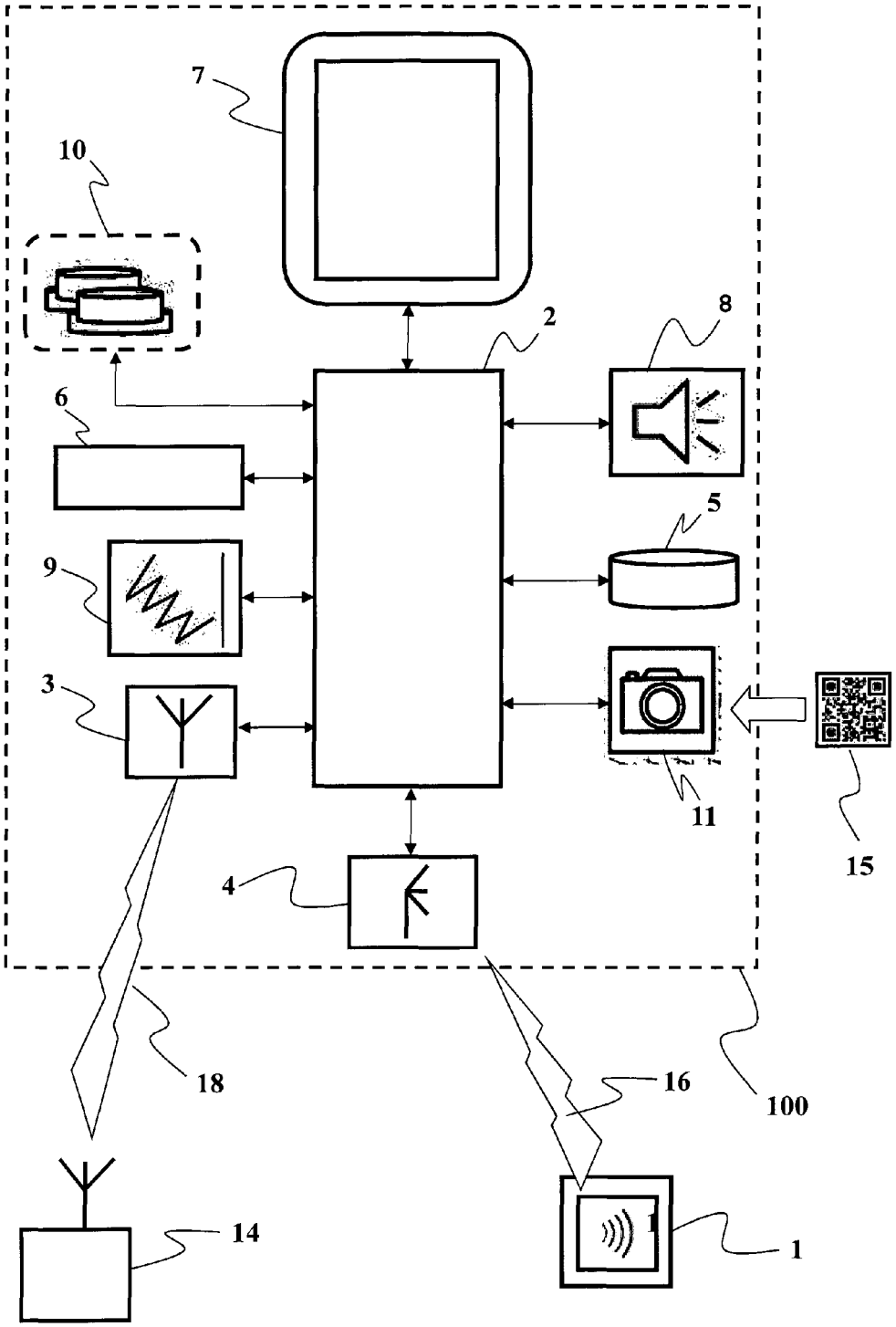
FIG. 1 is a block diagram showing the operation of a preferred embodiment of the device according to the invention.

In FIG. 1 one can see that said device 100, in order to be able to operate, comprises:

at least one wireless reception means 3 for receiving data;

at least one processing means 2, e.g. consisting of at least one CPU;

at least one filing means 5 and/or one storage means 6;

optionally, at least one reader 4 of radio frequency tags 1, for detecting and subsequently reading one or more radio frequency tags 1 arranged within a reference environment in accordance with a predefined layout;

at least one output means, e.g. consisting of at least one display 7, for displaying the results, preferably as at least one map of said environment.

It is also conceivable that the output means, instead of consisting of said display 7, consists of one or more different audio playback devices 8 or tactile-stimulus generators 9, which would make the map recognizable also to blind people.

The processing means 2 receives, through the wireless reception means 3, identification and localization information about the radio frequency tags 1 via radio signals 16, and stores it into the storage means 6 and/or the filing means 5. Upon receiving a command from the processing means 2, the reader 4 of radio frequency tags 1 may optionally detect the presence of any radio frequency tags 1 within its own coverage range through radio signals 16 received by said reader 4 in a manner substantially known in the art.

Then the processing means 2 updates the storage means 6 that contains the data for localization of the radio frequency tags 1, and subsequently it processes the localization data of the radio frequency tags 1 in the storage means 6 and outputs an updated map through the output means, e.g. by displaying it on the display 7 (or equivalent), possibly also indicating the current position.

The above-described operating cycle is carried out repeatedly, so as to allow for constant updating of the map being displayed as the user of the wireless device 100 is moving.

The data received through the wireless reception means 3 can be stored, for example, in the form of a table like the one shown in FIG. 4, wherein the number of rows and fields corresponds to the number of described radio frequency tags 1, the columns showing all or some of the following pieces of information:

univocal identifier of the radio frequency tag 1;

coordinates of the position of the device (latitude, longitude), or its three-dimensional position relative to a given geographical point;

floor number;

type of radio frequency tag 1 (perimeter, door, window, room, corridor);

area identifier.

It should not however be excluded that other rather different elements of interest present in the environment may also be included as references, such as: lifts, ramps, fire extinguishers, power outlets, trap doors, radiators, boilers, air intakes, and the like. For example, the display 7 may show symbols indicating the single radio frequency tags 1, in particular:

different types of radio frequency tags 1 are characterized by different symbols;

in some cases, the information may be arranged in a particular order, so as to provide a sorted sequence of steps (e.g. radio frequency tags 1 for a corridor may be identified in a predetermined order that allows reconstructing a sequence of linear steps; likewise, radio frequency tags 1 of a perimeter of a certain area may be represented by means of a continuous line going through them in an orderly manner);

radio frequency identifiers 1 belonging to the same logic geographical unit or to a more complex environmental structure made up of multiple elements (e.g. doors and windows afferent to the same room, or rooms belonging to the same department or office) are characterized by a common identification datum which allows to group them and to represent them within the area involved;

the actual distances, which can be deduced from the coordinate indication, are represented on the basis of a given scale such that they appear as realistic as possible, which scale may be resized by means of a specific command available on the device (e.g. buttons 10 or on-screen commands 7).

The devices capable of efficiently implementing the method described herein may be of different types, such as:

mobile devices (e.g. smartphones), comprising a display 7 (possibly, but not necessarily, a touch screen 9), a reader 4 of radio frequency tags 1 and/or an optical sensor 11, a wireless reception means 3, a processor 2, a storage means 6 and/or a filing means 5, as well as possible further components such as buttons 10 or audio playback devices 8;

devices for blind users, comprising button or voice commands 10, an audible-signal generator 8 or a tactile-stimulus generator 9, a reader 4 of radio frequency tags and/or an optical sensor 11, a wireless reception means 3 equipped with a processor 2, a storage means 6 and a filing means 5.

Any different configurations of said device 100 observing the same principle of operation as the above-described preferred embodiments will still fall within the protection scope of the present invention.

The information about the radio frequency tags 1 may be transmitted by suitable apparatuses 14 through any radio protocol, and is such that it can be received and interpreted by the wireless device 100 through the radio signals 18. Preferably, the information can be transmitted through a Wi-Fi network protocol, i.e. according to any standard of the IEEE 802.11 set. In particular, it is advantageous to transmit said information in the part transmitted in clear by any Wi-Fi access point, e.g. in the Wi-Fi beacon, so that any wireless device adapted to receive Wi-Fi signals can interpret it without any limitation due to the information security provided by these standards. It will thus be possible to use 35 existing Wi-Fi networks already in use in public buildings to transmit orientation information without interfering with secure information used by authorized users having access to said networks.

Figure 2:
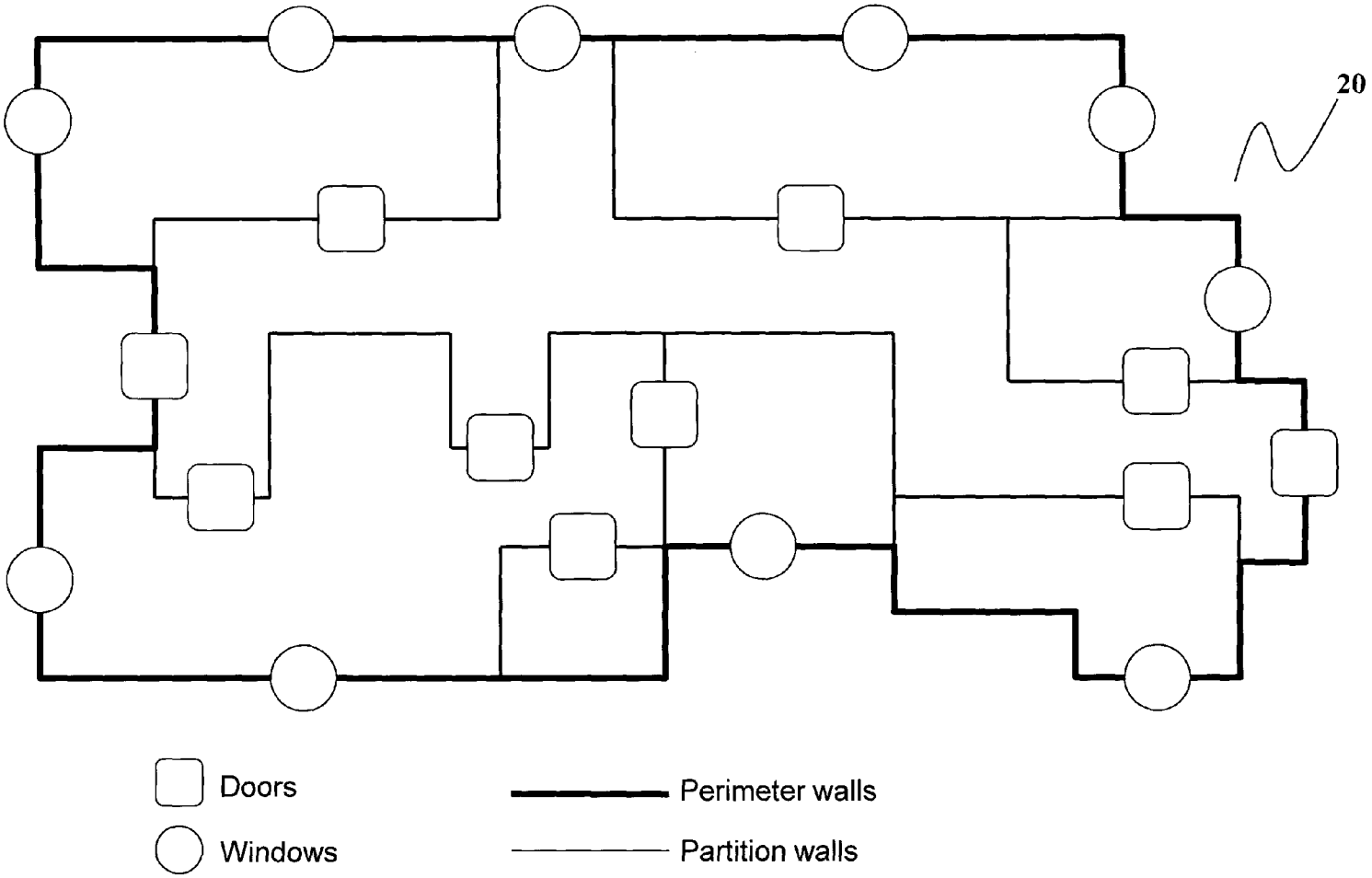
FIG. 2 shows the structure of a possible reference environment.

FIG. 2 shows one possible reference environment 20 consisting of a floor of a building, comprising perimeter walls, partition walls, windows, doors and rooms.

Figure 3:
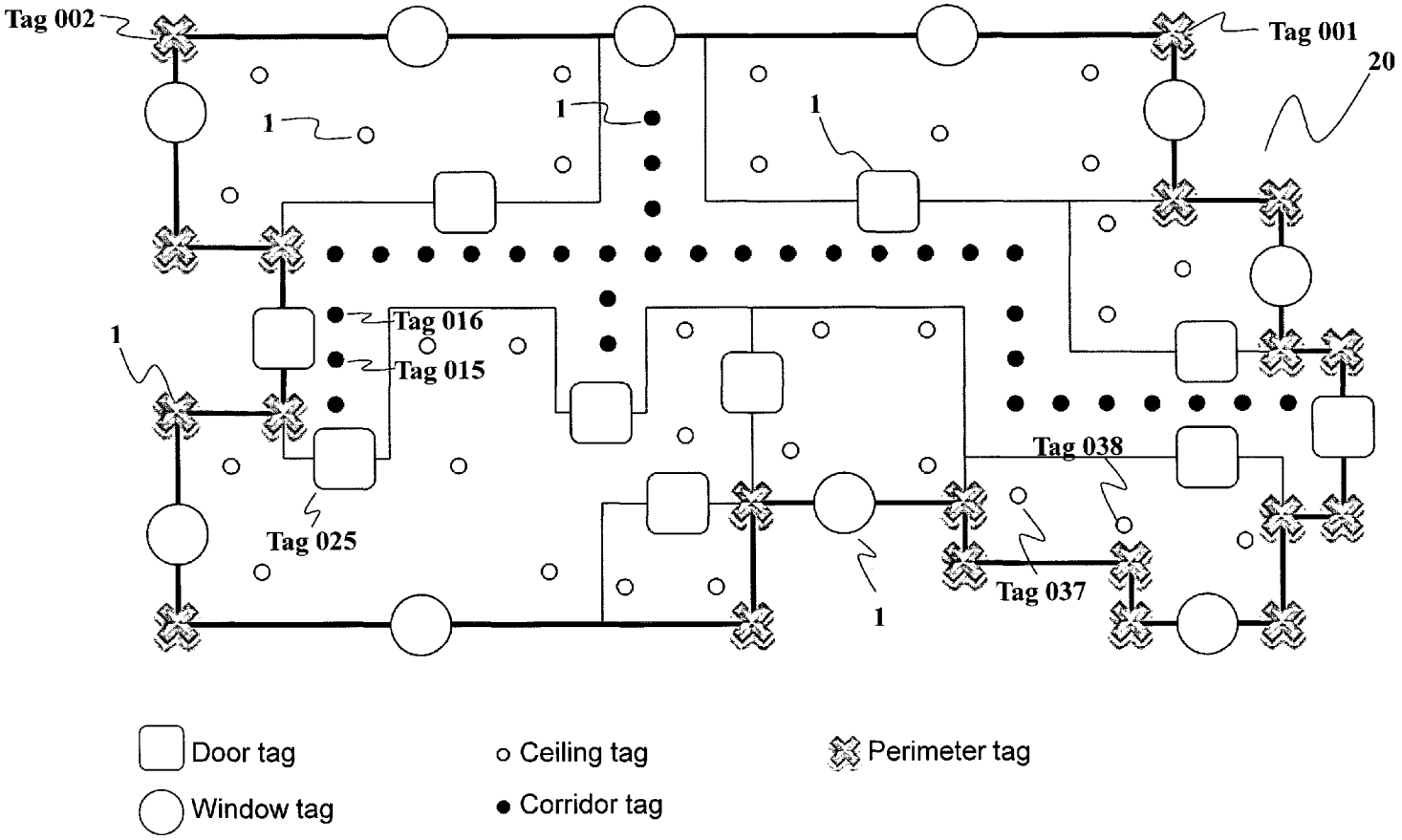
FIG. 3 shows a possible arrangement of radio frequency tags in the reference environment of FIG. 2.

FIG. 3 shows one possible arrangement of radio frequency tags 1 in the environment 20 shown in FIG. 2. In particular, by way of example, there are radio frequency tags 1 on doors, windows, corners of perimeter walls, and ceilings of rooms and corridors. This creates a grid of points in the environment, which allows a wireless device 100 located in the reference environment 20 to acquire information about the most significant elements present therein (rooms, corridors, passageways, escapes etc.) and to reconstruct a representation of a map of the environment that will help the user orientate him/herself.

FIG. 4 shows one possible table built by the processing means 2 based on the identification and localization data stored in the storage means 5 and/or contained in the filing means 6. Each row corresponds to at least one radio frequency tag 1 and comprises a univocal identifier (Tag ID), data about its geographical position (Latitude, Longitude and Elevation), information about the type of element of the reference environment 20 associated with the radio frequency tag 1 (e.g. Perimeter, Door, Room, Window), about the identification of said element (Room ID, Corridor ID, Perimeter ID) and about the position thereof within the environment 20 (e.g. Floor, Wing, Department, Section).

Figure 5:
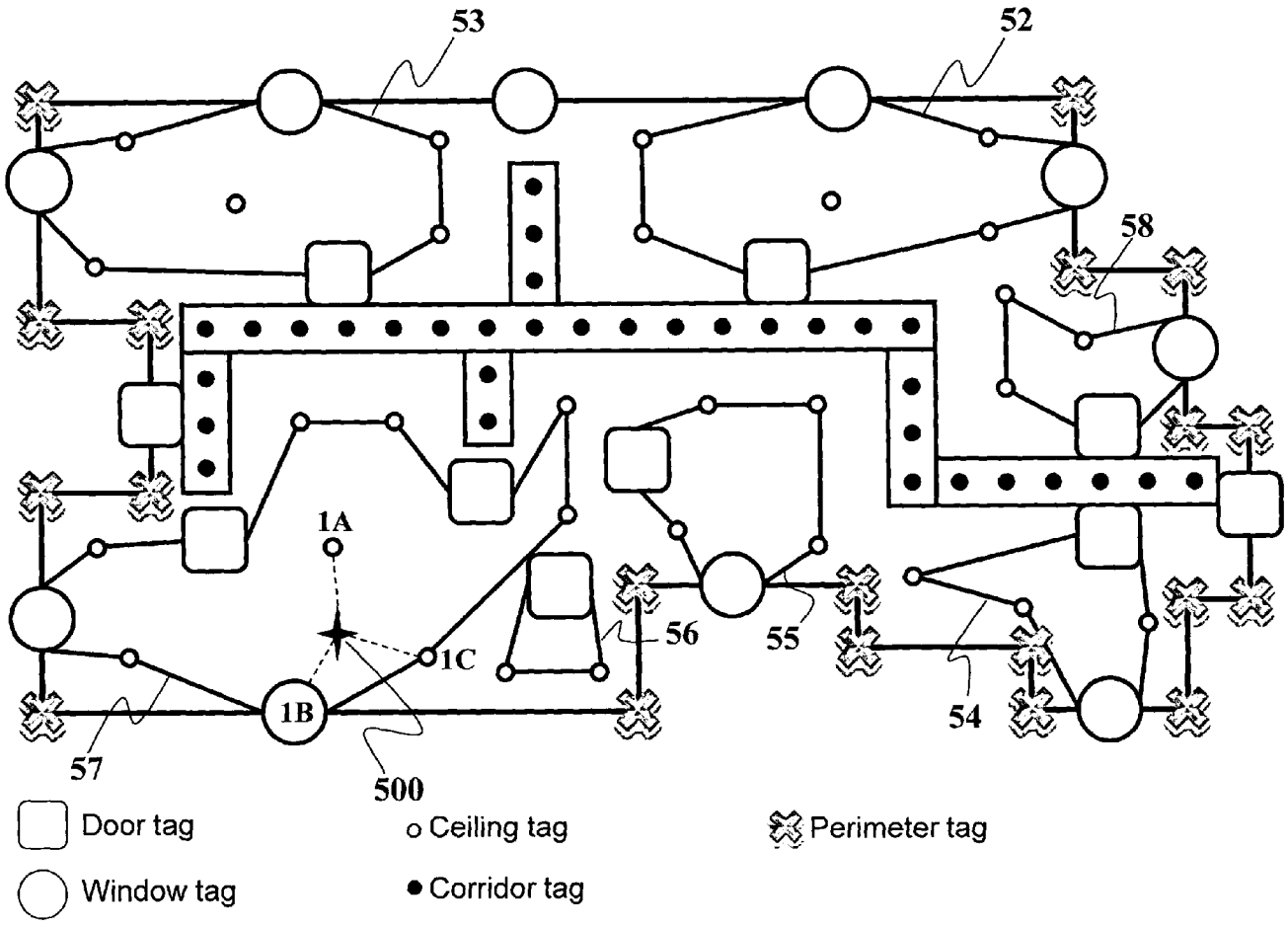
FIG. 5 shows the current position of a wireless device according to the invention in the reference environment of FIG. 2.

FIG. 5 shows one possible graphic representation of the environment map that can be obtained by the wireless device 100 by starting from the data contained in the table of FIG. 4; in this representation, the radio frequency tags 1 mentioned in said table have been highlighted by way of example. It roughly indicates the profile defined by the perimeter walls, the position of windows and doors, as well as the area, approximated by defect, taken up by the rooms 52, 53, 54, 55, 56, 57, 58, wherein the associated radio frequency tags 1 (of door, window and ceiling) are characterized by the same room identifier (Room ID in FIG. 4).

For example, the area 54 of FIG. 5 is approximately defined by the region that includes all those radio frequency tags 1 whose Room ID is 5.

The corridor radio frequency tags 1 in FIG. 5 indicate the area occupied by the corridor and may advantageously be associated with a sorted sequence, so as to indicate to the wireless device 100 a path to be followed in order to reach an escape or an emergency exit. Likewise, a sorted sequence may be associated with other types of radio frequency tags, e.g. the perimeter ones, to indicate to the wireless device 100 how to trace the profile of the perimeter walls for the purpose of obtaining a correct graphic representation, which can be done by drawing a line consecutively joining the various points (e.g. the points of a corridor that winds across the building, or of the perimetric profile of the building).

In order to avoid adding a field specifically dedicated to said sorted sequence, the latter may be implicitly indicated through a suitable selection or structure of the radio frequency tag (Tag ID), which may take appropriately increasing or decreasing numerical values to indicate that order.

If the wireless device 100 is equipped with a reader 4 of radio frequency tags, it receives radio signals 16 emitted by radio frequency tags sufficiently close to one another, which signals contain data about its geographical position and about the radio signal transmission power or other data useful for determining the distance travelled by them to reach a receiver. When radio signals 16 are received from at least three different radio frequency tags 1, the device 100 can establish its own position based on the knowledge of the position of the emitting radio frequency tags and of its own distance from such tags, which can be determined through the use of any known distance estimation technique by applying, according to the case, the known triangulation or multilateration system.

In the example of FIG. 5 it is assumed that the wireless device 100 is located in the point 500 and is receiving radio signals 16 from the three radio frequency tags 1A, 1B e 1C. In this case, the device 100 can estimate its own position by starting from the knowledge of the positions of 1A, 1B and 1C, received through the radio signals emitted by them, and by estimating the distance from each of them based on said radio signals by using any known technique and by applying the triangulation system to the data thus obtained. In this way, the wireless device 100 can calculate its own position through the processing means 2 and can represent it in one way or another through an output means 7, e.g. graphically on a map screen as a suitable graphic symbol or through an audible message emitted by an audio player under the control of a voice synthesizer, which for example says to the user "You are in room 4 on the first floor". When the map of the environment is reconstructed as a graphic representation, the actual distances (deduced from the analysis of the coordinates of the radio frequency tags 1) will be reduced according to a scale which is adequate for representing them on the display of the device (possibly resizable through a suitable command entered through a touch screen 7 or buttons 10).

The map thus built will then be filled with the points indicating doors, windows, corridors, rooms, etc. Points sharing the same area identifier (room, corridor, perimeter) may be highlighted with a special stroke or colour, thus grouping them into one set.

Aiming at limiting the number of applied radio frequency tags 1, and at reducing the quantity of information transmitted to the device 100 through the Wi-Fi beacon, the radio frequency tags 1 relating to any internal partition walls in the environment will not be indicated: the resulting representation of the environment will have a certain degree of approximation, which will however be such as to ensure the perception of one's position with respect to the surrounding environment.

If the device 100 is equipped with a compass, it will also be possible to indicate the directional orientation on the map.

The choice pertaining to the arrangement of the radio frequency tags 1 within the environment can be made in such a way as to ensure an even coverage of the environmental areas which are considered to be of interest: said positions are then recorded and archived to be easily made available to the device 100.

It is also conceivable that the device 100 has an internal logic which can give the user (whether graphically on the display 7 or by means of audible and/or tactile signals produced by suitable audible 8 or tactile 9 signal generators) information about the environment 20 where he/she currently is, such as the type and the position of elements belonging to said environment 20 and the direction to be followed in order to reach a certain destination, which can be selected, for example, through a touch screen 7, a voice command system or buttons 10.

The advantage offered by the solution described herein is therefore apparent, in that this solution, in addition to what was already available from the prior art, adds the possibility of reconstructing, for example as a graphic representation, the approximate map of the environment 20 where a person is, the particular points of interest of which are highlighted in order to make it easier for the user to orientate him/herself in an unknown or unfamiliar place; furthermore, the radio frequency tags 1 employed may be passive ones, i.e. commercially available at low cost, and there may be a large number of them arranged in the environment as necessary.

Another clear advantage derives from the fact that the map can be reconstructed by using a very small quantity of information (approx. ten bytes per radio frequency tag 1).

Within the frame of a different implementation of the invention, it is also conceivable to replace or supplement the radio frequency tags 1 with simple QR codes or bidimensional bar codes 15, which can be easily read through the camera built in a common smartphone device: just like the radio frequency tags 1, said code can provide a simple univocal identifier.

Finally, for simpler devices lacking a radio frequency tag reader 4 or a camera, it is possible to conceive a variant of the present invention which allows the user to manually enter the QR code 15, which he/she may have learnt from a signalling available in the reference environment.

The method for reconstructing the map of an environment surrounding a wireless device and the wireless device implementing such method described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to a method for reconstructing the map of an environment surrounding a wireless device and a wireless device implementing such method, but may be subject to many modifications, improvements or replacements of equivalent parts and elements without departing from the novelty spirit of the inventive idea, as clearly specified in the following claims.

The invention claimed is:

1. A method for *graphically* reconstructing [graphically] a map of an environment [surrounding] *in* a wireless device, *the wireless device providing a graphic representation of the environment where the device is located without having previously obtained information about the environment*, said environment [being equipped with a plurality of] *comprising a plurality of complex environmental structures, each of the plurality of complex environmental structures comprising a physical structure being made of a plurality of simple elements each having a radio frequency tag associated therewith, the* radio frequency tags *being* set in a number dependent on a level of detail to be obtained in said reconstruction, said device comprising:

[at least one] *a* wireless receiver *other than a radio frequency tag reader* configured to receive identification and localization data of said radio frequency tags associated with *the simple* elements present in said environment;

[at least one] *a* processor;

[at least one] *a* filing and/or storage component;

[at least one] *an* output component configured to provide visual information about said environment, said method comprising the steps of:

receiving *by said wireless receiver* identification and localization data [of said plurality of] *for each of said* radio frequency tags available in said environment over a wireless connection[by said at least one wireless receiver], wherein said identification and localization data *for each radio frequency tag* comprises [associated] information about [at least one] *a location of the associated simple* element present in said environment and about an element type [thereof] *of the associated simple element*;

storing said identification and localization data [and said associated] *for each of said radio frequency tags including the* information [of said one or more radio frequency tags] *about the location and element type of each associated simple element* into said filing and/or storage component by said processor;

providing on said output component at least one map of said environment, wherein the map is reconstructed by said processor [by] *graphically* representing [graphically the environmental] *said simple* elements *of the environment* associated to said radio frequency tags based on [their position, associated element] *the information about the location* and element type *of each simple element*, wherein [single] *simple* elements belonging to the same *element* type are characterized *in said map* by the same graphic representation*;*

*wherein said identification and localization data comprises a different identifier for each simple element of the environment;*

[and connected to other elements of the same type] *wherein the simple elements pertaining to a same complex environmental structure are* individuated *from the other simple elements* by a common identification datum *within said identification and localization data*, when pertaining to a complex environmental structure *of the environment* made up of *the* multiple *simple* elements;

*wherein at least one of the plurality of complex environmental structures is rebuilt in the map by graphically connecting one to the other the graphic representations of the simple elements of the same element type individuated by said common identification datum according to a particular order indicated in said identification and localization data so as to produce a graphic representation of the corresponding physical structure;* wherein said identification and localization data are stored in [the] *a* form of at least one table, and [that] *wherein* in said at least one table there is at least one row for each of said radio frequency tags[, and that in columns of said table are represented, either fully or partially,] *and* at least the following fields belonging to said identification and localization data of said radio frequency tags[;] *are represented in columns of said at least one table, either fully or partially:* univocal identifier of one of said radio frequency tags;

coordinates, [in particular] *comprising one or more of:* latitude, longitude, elevation, or geographical position, of *said radio frequency tag associated with* one *simple* element of said environment[associated with the radio frequency tag];

[type of radio frequency tag defining at least one element] *element type* present in said environment which the radio frequency tag is associated with.

2. A method according to claim 1, wherein said radio frequency tags are replaced or supplemented with QR codes, or bidimensional bar codes.

3. A method according to claim 2, wherein the values corresponding to the QR codes *or to the bidimensional bar codes*, learnt on the basis of a signalling available in said environment, are entered manually by the user of the wireless device.

[4. A method according to claim 3, wherein said identification and localization data of a radio frequency tag comprise information about further elements of interest, different from one another but equally present in the reference environment.]

[5. A method according to claim 4, wherein said at least one table includes additional rows and/or columns containing information about said further elements of interest.]

[6. A method according to claim 1, wherein the elements of said complex environmental structure are connected to each other according to a particular order indicated in said associated information.]

7. A method according to claim 1, wherein said wireless device comprises a reader of radio frequency tags, configured to detect said radio frequency tags present within its own coverage range, the method further comprising *the* step of: receiving radio signals from at least one of said radio frequency tags, [of] estimating the position thereof through said [at least one] processor on the basis of the received radio signals, and [of] providing on said output component said estimated position within said map of said environment.

8. A method according to claim 1, wherein [the information] *said identification and localization data* necessary for building said map has [the] *an* order of magnitude of tens of bytes for each one of said radio frequency tags.

9. A wireless device comprising:

[at least one] *the* wireless receiver *used in claim 1*;

[at least one] *the* processor *used in claim 1*;

[at least one] *the* filing and/or storage component *used in claim 1*;

[at least one] *the* output component[,] *used in claim 1; and* which are configured to implement said method *steps carried out by said receiver, processor and said components* according to claim [3] *1*.

10. A device according to claim 9, wherein said output component comprises at least one display and/or at least one touch screen and/or an audio playback unit, and/or a tactile-stimulus production unit, configured to reproduce information about the [reference] environment on said map, respectively as a graphic, audio or tactile reproduction.

[11. A method for reconstructing graphically a map of an environment by an electronic device, starting from a table comprising a plurality of references to elements of interest of said environment, said device comprising:

at least one processor;

at least one filing and/or storage component;

at least one output component configured to provide visual information about said environment, said method comprising the steps of:

storing in said filing and/or storage component for each of said element of interest a row of said table comprising fields indicating identification and localization data, wherein said data comprises the position of the element in the environment and the indication of an element type;

acquiring from said filing and/or storage component said identification and localization data of said plurality of elements of interests, and;

providing on said output component at least one map of said environment, wherein the map is reconstructed by said processor by representing graphically the environmental elements of interest based on their position, associated element and element type and wherein single elements belonging to the same type are characterized by the same graphic representation and connected to other elements of the same type individuated by a common identification datum stored in said table, when pertaining to a complex environmental structure made up of multiple elements;

wherein said identification and localization data are stored in the form of at least one table, and that in said at least one table there is at least one row for each of said radio frequency tags, and that in columns of said table are represented, either fully or partially, at least the following fields belonging to said identification and localization data of said radio frequency tags: univocal identifier of one of said radio frequency tags; coordinates, in particular latitude, longitude, elevation, or geographical position of one element of said environment associated with the radio frequency tag; type of radio frequency tag defining at least one element present in said environment which the radio frequency tag is associated with.]

[12. The method according to claim 11, wherein the elements of said complex environmental structure are connected to each other according to a particular order indicated in said data.]

[13. The method according to claim 11, wherein the actual distances of the environment represented by said map can be deduced from said localization data and are represented on the basis of a given scale, which scale can be resized by means of a specific command available on the device.]

[14. An electronic device comprising at least one processor;

at least one filing and/or storage component;

at least one output component, which are configured to implement the method according to claim 11.]

15. The method according to claim 1, wherein the actual distances of the environment represented by said map [can be] *are* deduced from said localization data and are represented on the basis of a given scale, which scale [can be resized] *is resizable* by means of a specific command available on the device.

16. The method according to claim 1, wherein the *receiving by said* wireless receiver [is configured to receive] said identification and localization data *is performed* in the part received in clear from a Wi-Fi access point.

*17. A method according to claim 1, wherein the graphic representations of the simple elements of the rebuilt complex environmental structure are graphically connected together by lines so as to form a closed loop that graphically represents the corresponding physical structure.*

*18. A method according to claim 1, further comprising at least the following field belonging to said identification and localization data of said radio frequency tags being represented in a column of said at least one table:*

*a type ID, which has a different value for each distinct complex environmental structure of the environment pertaining to the same type and a same value for each simple element pertaining to the same complex environmental structure to be represented on the map.*

*19. A method according to claim 1, wherein the plurality of simple elements for each complex environmental structure comprises at least three simple elements.*

*20. A wireless device comprising*

*the wireless receiver, the processor, the filing and/or storage component and the output component of claim 1 being configured to jointly implement the method for graphically reconstructing a map of an environment according to claim 1, said environment being equipped with a plurality of radio frequency tags set in a number dependent on a level of detail to be obtained in said reconstruction;*

*wherein said device further comprises a reader of radio frequency tags;*

*said reader being configured to detect said radio frequency tags present within its own coverage range, said processor being configured to receive radio signals from at least one of said radio frequency tags by means of said reader, to estimate the position thereof on the basis of the received radio signals, and to provide on said output component said estimated position within said map of said environment.*

* * * * *